(12) United States Patent
Wolf

(10) Patent No.: US 10,829,049 B2
(45) Date of Patent: Nov. 10, 2020

(54) MOTOR VEHICLE EXTERIOR MIRROR

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 15 days.

(21) Appl. No.: 15/714,106

(22) Filed: Sep. 25, 2017

(65) Prior Publication Data
US 2018/0086270 A1   Mar. 29, 2018

(30) Foreign Application Priority Data

Sep. 29, 2016  (DE) .......................... 10 2016 118 447

(51) Int. Cl.
*G02B 7/182* (2006.01)
*B60R 1/06* (2006.01)

(52) U.S. Cl.
CPC .................. *B60R 1/0602* (2013.01)

(58) Field of Classification Search
CPC .... B60R 1/006–025; B60R 1/06–0602; B60R 1/08; G02B 5/10; G02B 5/08
USPC .................................................. 359/872, 871
See application file for complete search history.

(56) References Cited

U.S. PATENT DOCUMENTS

| | | | | |
|---|---|---|---|---|
| 5,903,389 A * | 5/1999 | Rumez | ...................... | B60R 1/06 359/507 |
| 6,386,712 B1 * | 5/2002 | Warner | ...................... | B60R 1/06 359/507 |
| 8,167,442 B1 * | 5/2012 | Hidden | ................. | B60R 1/0602 359/507 |
| 9,457,721 B2 * | 10/2016 | Takahashi | ............... | B60R 1/006 |
| 2003/0026008 A1 * | 2/2003 | Tanaka | ...................... | B60R 1/06 359/838 |
| 2008/0291560 A1 | 11/2008 | Mueller | | |
| 2010/0157451 A1 * | 6/2010 | Sugiyama | ................. | B60R 1/06 359/841 |
| 2012/0206827 A1 * | 8/2012 | Wolf | ........................ | B60R 1/06 359/871 |

FOREIGN PATENT DOCUMENTS

| | | |
|---|---|---|
| CN | 106882120 A | 6/2017 |
| DE | 40 39 484 | 6/1992 |

(Continued)

OTHER PUBLICATIONS

German Search Report dated May 10, 2017.
French Search Report dated Oct. 5, 2018.

*Primary Examiner* — Stephone B Allen
*Assistant Examiner* — Jyotsna V Dabbi
(74) *Attorney, Agent, or Firm* — Gerald E. Hespos; Michael J. Porco; Matthew T. Hespos

(57) ABSTRACT

A motor vehicle exterior mirror has a curved mirror housing, a housing foot with which the mirror housing can be fixed to the motor vehicle, and a reflective mirror body arranged in an opening on the rear of the mirror housing. A separation edge extends approximately in the transverse direction on the underside of the mirror housing and elevated guide elements are provided on the underside of the mirror housing adjoining the separation edge toward the front. The guide elements prevent rainwater from being able to flow away in the proximal direction on the underside of the mirror housing.

15 Claims, 2 Drawing Sheets

(56) References Cited

FOREIGN PATENT DOCUMENTS

| | | |
|---|---|---|
| DE | 103 51 857 | 6/2005 |
| DE | 10 2005 019 778 | 11/2006 |
| DE | 10 2009 036 728 | 2/2011 |
| DE | 10 2011 000 740 | 8/2012 |
| EP | 1 995 117 | 11/2008 |
| KR | 20040043851 A | 5/2004 |
| KR | 20050021162 A | 3/2005 |
| WO | 2005019006 A1 | 3/2005 |

* cited by examiner

MOTOR VEHICLE EXTERIOR MIRROR

CROSS REFERENCE TO RELATED APPLICATION

This application claims priority under 35 USC 119 to German Patent Appl. No. 10 2016 118 447.0 filed on Sep. 29, 2016, the entire disclosure of which is incorporated herein by reference.

BACKGROUND

Field of the Invention

The invention relates to a motor vehicle exterior mirror having a mirror housing and a reflective mirror body in a rear mirror housing opening.

Description of the Related Art

In the following description, all directional statements relate to the direction of travel of the vehicle.

Motor vehicle exterior mirrors are fit to the outside of the vehicle and therefore are subjected to rain and other weathering. Prior art motor vehicle exterior mirrors frequently have an elevated separation edge on the underside of the mirror housing. The elevated separation edge is approximately parallel to a rear housing front edge and approximately transverse to the vehicle longitudinal direction. The separation edge improves aerodynamics of the exterior mirror thereby reducing air resistance and noise, and also defines a separation location of rainwater on the mirror housing to reduce the contamination of the mirror body. Exterior mirrors having separation edges extending in the transverse direction are known from EP 1 995 117 B1, DE 10 2009 036 728 A1, DE 10 2005 019 778 B4 and DE 10 2011 000740 A1.

Rainwater collects in front of the separation edge and water droplets ultimately break away from the separation edge to the rear by the force of gravity and by the wind force generated by the airstream. Rainwater building up on the underside also can be given an impulse toward the vehicle center (i.e. the proximal direction), for example in the event of transverse acceleration as the vehicle travels a curve and/or in the event of a side wind. As a result, the rainwater migrates to the underside of the mirror housing in the proximal direction and only breaks off close to the vehicle and at a position the adjacent vehicle side window, thereby adversely affecting the view of the vehicle driver toward the side mirror.

Against this background, it is an object of the invention to provide a motor vehicle exterior mirror that reduces the contamination of the adjacent vehicle side window.

SUMMARY

The motor vehicle exterior mirror according to the invention has a convexly curved mirror housing and a housing foot with which the mirror housing can be fixed laterally to the motor vehicle. The mirror housing has an opening on the rear side in relation to the direction of travel, and a reflective mirror body is held at the opening so that the vehicle driver can observe the lateral rear area behind his vehicle.

A separation edge is formed on the underside or the lower front edge of the mirror housing and extends approximately in the vehicle transverse direction. The separation edge can be formed by the mirror housing front edge itself or by a separation web that projects down and/or is elevated. Alternatively, the separation edge can be a channel formed parallel to and in front of the mirror housing front edge or the dividing line of the channel wall on the underside of the mirror housing.

The separation edge extends over a large part of the underside of the mirror housing, for example over at least half the mirror housing width.

At least two elevated guide elements project down from the base area on the underside of the mirror housing at positions substantially adjoining the separation edge toward the front. The guide elements may directly adjoin the separation edge or may be spaced forward from apart the separation edge. However, the spacing in the longitudinal direction between the separation edge and the guide element should be only so large that no noticeable liquid flows in the transverse direction can result in this interspace. This spacing therefore may be 10 mm or less.

The guide elements prevent rainwater collecting and backing up on the underside from flowing in the transverse direction or proximal direction along the separation edge. Thus, the guide elements stop the rainwater collecting on the mirror housing underside from flowing in the transverse direction, so that the rainwater ultimately breaks off in the form of droplets in the area of the guide elements. This prevents the situation where the rainwater that is backed up migrates in the transverse direction along the separation edge toward the proximal end of the separation edge and breaks off at the proximal end in response to transverse forces caused by side wind and/or transverse acceleration as the vehicle travels a curve. Furthermore, the effect of the guide elements is that in the event of a lateral flow over a guide element, the rainwater that has flowed over breaks off on the following guide element.

The guide elements define the lateral location at which the rainwater breaks off. Thus, the separation location for a large part of the rainwater no longer lies in the immediate vicinity of the side window when there are transverse forces in the proximal direction. Accordingly, there is less wetting and contamination of the adjacent side window by rainwater coming from the exterior mirror.

The spacing of the guide elements in the longitudinal direction from the separation edge extending in the transverse direction is at most 8 mm, and preferably at most 4 mm. This feature must apply to at least two but not to every guide element if there are more than two guide elements. In any case, the longitudinal spacing or the gap should be so small that no noticeable flow of the rainwater in the transverse direction can be formed along the separation edge.

The guide elements may be web-like rib elements extending substantially in the longitudinal direction. The guide elements therefore project forward from the separation edge or from the separation web and are aligned approximately in the longitudinal direction. The guide elements can be 5-10 mm long, for example, but in principle can also extend over more than 10 mm in the longitudinal direction. As a result, rainwater flowing on the mirror housing underside in the direction of the vehicle rear is prevented at a relatively early stage from flowing farther in the proximal direction on the mirror housing in the area of the guide elements. In this way, the total quantity of rainwater migrating proximally is reduced.

The rib elements that form the guide elements may merge continuously into the separation web defining the separation edge. Thus, there are no openings that allow a flow of rainwater in the proximal direction between the guide element ribs and the separation edge web.

The guide elements may be distributed over at least half the separation edge width. In the present case, the separation edge width is understood to mean the extent of the separation edge in the vehicle transverse direction. The guide elements or the rib elements are therefore arranged to be distributed generously in the transverse direction over the underside of the mirror housing.

In one embodiment, the guide elements are elevated studs. The studs may be circular, but can have oval or other shapes. Studs have the advantage that the rainwater droplets collect on each stud and break off easily because of the relatively small stud area. The studs may be arranged as close as possible to the separation edge so that the rainwater on the underside of the mirror housing is prevented from flowing along the separation edge in the transverse direction.

The studs may be distributed on two or more rows extending in the transverse direction, and may be arranged in rows offset relative to each other in the transverse direction, so that the connecting line between the respectively nearest stud results in a zigzag line.

In the following text, two exemplary embodiments of the invention will be explained in more detail by using the drawings.

DETAILED DESCRIPTION

Figure 1:
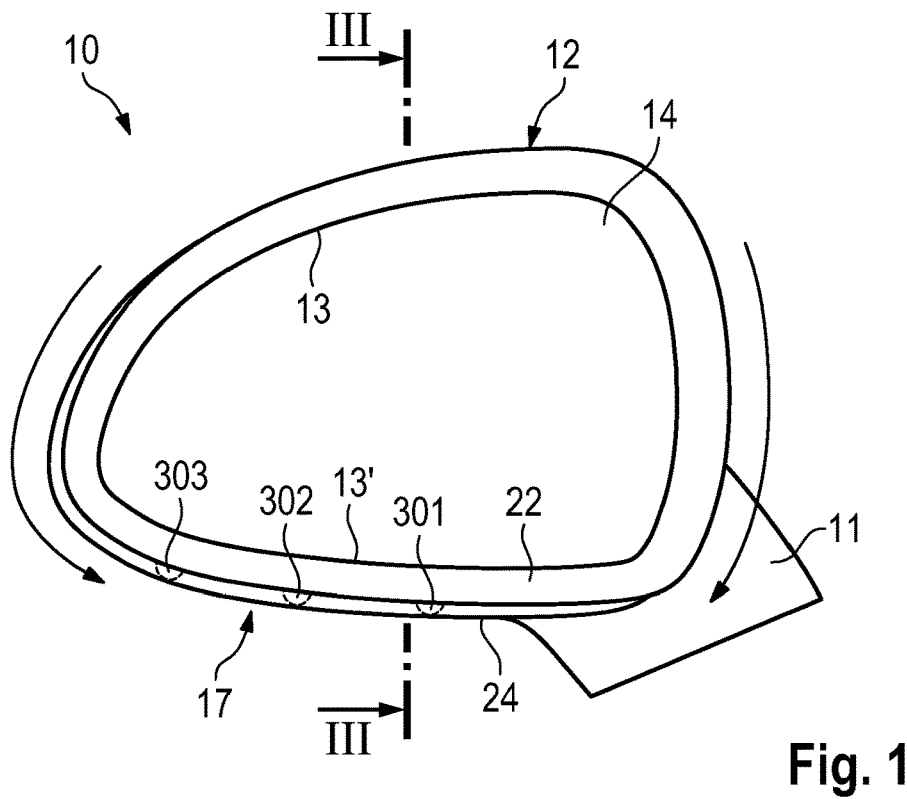
FIG. 1 shows the rear side of a motor vehicle exterior mirror having three guide elements formed as web-like rib elements.

The figures show a motor vehicle exterior mirror 10, which, in the present case, is a left-hand exterior mirror, as seen in the direction of travel F. All of the following directional statements relate to the vehicle in the direction of travel F. The exterior mirror 10 has a convexly curved mirror housing 12 made of opaque plastic. The mirror housing 12 is fixed via a housing foot 11 to a motor vehicle, not shown, or to the bodywork or the vehicle door. A mirror opening 13 is formed at the rear side of the mirror housing 12. A mirror body 14 is seated in the mirror opening 13 and covers most of the mirror opening 13 without contacting the edge 13' of the opening. The mirror body 14 is held on the mirror housing 12 by an appropriate mechanism, not illustrated.

Figure 2:
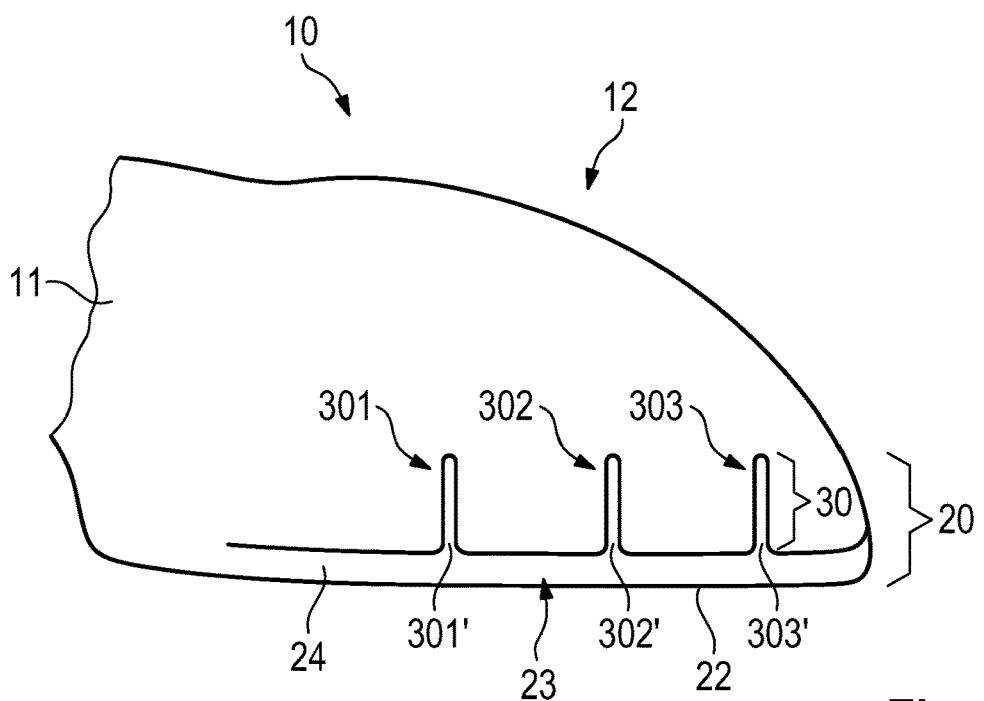
FIG. 2 is a bottom view of the motor vehicle exterior mirror of FIG. 1.
Figure 3:
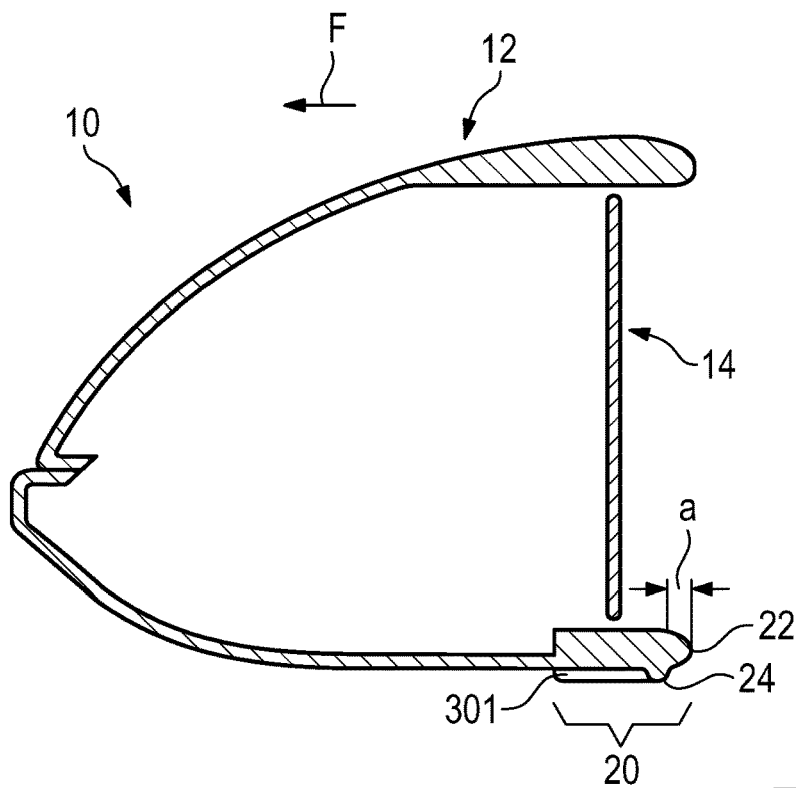
FIG. 3 is a longitudinal section of the vehicle exterior mirror of FIG. 1.

The underside 17 of the mirror housing 12 of the exterior mirror 10 of the first embodiment is illustrated in FIG. 2. The underside of the housing 12 has a lower housing front edge 22 that represents the foremost line of the mirror housing 12 in the area of the underside 17. A separation edge 24 is formed parallel to the housing front edge 22, on the underside 17 and extends over approximately the entire width of the underside 17 of the mirror housing 12. The separation edge 24 is formed by an appropriately shaped and elevated separation web 23 that projects down out of the base area of the housing underside 17. The longitudinal spacing between the housing front edge 22 and the separation edge 24 preferably is 5-15 mm.

The underside 17 of the mirror housing 12 has guide elements 301-303 formed as web-like ribs 301'-303' that extend substantially in the vehicle longitudinal direction and that are approximately parallel to one another. The front ends of the three ribs 301'-303' or guide elements 301-303 have a vertical elevation or height of about 2-10 mm, which equals the vertical height of the separation web 23, so that the ribs 301'-303' merge continuously into the separation web 23 that defines the separation edge 24.

No gap is formed between the guide elements 301-303 and the separation web 23, so that here no rainwater can flow in the transverse direction without getting into the air stream flowing past the separation web 23. The ribs 301'-303' are arranged at the same lateral spacing from one another and are distributed over approximately half the width of the separation edge 24. The width of the guide element rib elements 301'-303' is about 2-5 mm. The length of the guide element ribs 301'-303' is about 1-4 cm. The guide elements 301-303 together form a guide element group 30 which, together with the separation web 23, form a rainwater mimic 20.

Rain runs laterally down from the top of the mirror housing 12, as indicated by the curved arrows on the right and left of the mirror housing 12. The airstream pushes the rainwater rearward on the underside 17, so that the rainwater collects at the separation edge 24 and ultimately breaks off there in the form of droplets. Accumulated rainwater flows in the proximal transverse direction on the underside 17 in response to transverse acceleration to the right that occurs when the vehicle travels a curve to the left and/or in response to side wind from the left. This proximal transverse flow on the underside will continue until the rainwater strikes the web-like guide elements 301-303 from the left and breaks off there. The guide elements 301-303 prevent rainwater from migrating completely toward the proximal side of the mirror housing 12 and only breaking off there.

Figure 4:
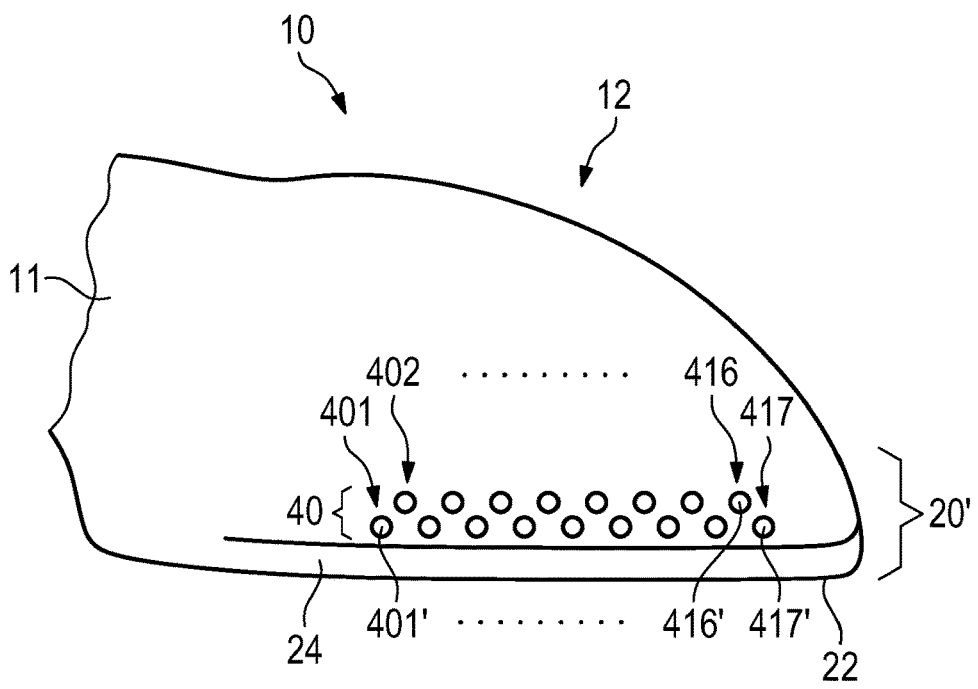
FIG. 4 shows a second embodiment of a motor vehicle exterior mirror having guide elements formed as studs.

A second embodiment of a motor vehicle exterior mirror 10 is illustrated in FIG. 4. The guide elements 401-417 in FIG. 4 are formed as elevated studs 401'-417'. Each stud 401'-417' has a diameter of 5-20 mm and a vertical elevation or height of 1-10 mm. The guide elements 401-417 are arranged in two rows extending approximately in the transverse direction, specifically a front row of studs 401', 403' . . . 417' and a rear row of studs 402', 404' . . . 416'. The studs 401', 403' . . . 417' of the front row are offset in the transverse direction in relation to the studs 402', 404' . . . 416' of the rear row.

The guide elements 401-417 form a guide element group 40 which, together with the separation web 23, forms a rainwater mimic 20'. The guide elements 401-417 prevent rainwater in this area from flowing in the proximal direction. Furthermore, the stud-like guide elements 401-417 also act as local separation points, at which rainwater droplets form, grow and finally break off.

What is claimed is:

1. An exterior mirror for a motor vehicle, comprising:
a curved mirror housing having opposite front and rear ends spaced apart in a longitudinal direction of the motor vehicle, a rear-facing opening formed in the rear end, and an underside defining a lower surface extending between the front and rear ends;
a housing foot with which the mirror housing can be fixed to the motor vehicle;
a reflective mirror body arranged in the opening on the rear end of the mirror housing;
a separation web projecting down from the underside of the mirror housing substantially adjacent the rear-facing opening of the mirror housing and having a rearwardly facing surface extending continuously in a direction transverse to the longitudinal direction, a lower end of the separation web defining a separation edge; and a plurality of elevated guide elements projecting down from the lower surface on the underside of the mirror housing at positions forward from the separation web, a downward projecting distance of each of the guide elements from the lower surface of the mirror housing being substantially equal to a downward projecting distance of the separation web from the lower surface of the mirror housing.

2. The exterior mirror of claim 1, wherein the guide elements are arranged in a longitudinal direction of the vehicle with a spacing of at most 8 mm in relation to the separation edge.

3. The exterior mirror of claim 1, wherein the guide elements are web-like ribs extending substantially in the longitudinal direction.

4. The exterior mirror of claim 3, wherein each of the ribs merges continuously into the separation web.

5. The exterior mirror of claim 3, wherein the web-like ribs are distributed over at least half of a width of the separation edge.

6. The exterior mirror of claim 3, wherein the web-like ribs are spaced from one another in the direction transverse to the longitudinal direction by a distance that exceeds a width of each of the web-like ribs in the direction transverse to the longitudinal direction.

7. The exterior mirror of claim 1, wherein the guide elements comprise elevated studs.

8. The exterior mirror of claim 7, wherein the studs are arranged in rows extending in the direction transverse to the longitudinal direction.

9. The exterior mirror of claim 8, wherein the studs of a row are offset in the direction transverse to the longitudinal direction in relation to the studs of an adjacent row.

10. The exterior mirror of claim 1, wherein the separation edge is spaced forward from the rear end of the mirror housing by a distance of no more than 15 mm.

11. The exterior mirror of claim 1, wherein the separation edge is rearward of the reflective mirror body.

12. The exterior mirror of claim 1, wherein the elevated guide elements have rear ends merging into and closed by the separation edge.

13. The exterior mirror of claim 1, wherein each of the elevated guide elements has a width in a range of 2-5 mm.

14. The exterior mirror of claim 1, wherein a spacing between the elevated guide elements exceeds a width of each of the guide elements in the direction transverse to the longitudinal direction.

15. The exterior mirror of claim 14, wherein a spacing between the elevated guide elements is more than twice the width of each of the guide elements.

\* \* \* \* \*